US012794735B2

(12) United States Patent
Zeng et al.

(10) Patent No.: US 12,794,735 B2
(45) Date of Patent: Nov. 10, 2026

(54) REFERENCE SIGNAL DETERMINING METHOD, REFERENCE SIGNAL PROCESSING METHOD, AND RELATED DEVICE

(71) Applicant: VIVO MOBILE COMMUNICATION CO., LTD., Guangdong (CN)

(72) Inventors: Yu Zeng, Guangdong (CN); Siqi Liu, Guangdong (CN); Zichao Ji, Guangdong (CN); Huan Wang, Guangdong (CN); Shixiao Liu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 352 days.

(21) Appl. No.: 18/299,860

(22) Filed: Apr. 13, 2023

(65) Prior Publication Data

US 2023/0291611 A1 Sep. 14, 2023

Related U.S. Application Data

(63) Continuation of application No. PCT/CN2021/123994, filed on Oct. 15, 2021.

(30) Foreign Application Priority Data

Oct. 16, 2020 (CN) .......................... 202011112977.4

(51) Int. Cl.
*H04L 25/02* (2006.01)
*H04L 5/00* (2006.01)
(Continued)

(52) U.S. Cl.
CPC ........ *H04L 25/0224* (2013.01); *H04L 5/0048* (2013.01); *H04W 72/23* (2023.01); *H04W 72/25* (2023.01)

(58) Field of Classification Search
CPC .. H04L 5/0048; H04L 25/0224; H04W 72/23; H04W 72/25
See application file for complete search history.

(56) References Cited

U.S. PATENT DOCUMENTS

2020/0053724 A1* 2/2020 MolavianJazi ....... H04L 5/0048
2020/0053743 A1* 2/2020 Cheng .................. H04W 72/23
(Continued)

FOREIGN PATENT DOCUMENTS

CN 110972246 A 4/2020
WO 2020029985 A1 2/2020
(Continued)

OTHER PUBLICATIONS

Samsung, Summary of NR UL power control—CA/DC aspects, 3GPP TSG RAN WG1 Meeting #94bis, R1-1811889, Oct. 8-12, 2018, Chengdu, China.
(Continued)

*Primary Examiner* — Brian P Cox
(74) *Attorney, Agent, or Firm* — Price Heneveld LLP

(57) ABSTRACT

This application discloses a reference signal determining method, a reference signal processing method, and a related device. The method includes: implementing a first operation in a case that a first object schedules a resource of a second object for sidelink SL transmission/reception, where the first object and the second object each are one of a cell, a frequency, and a carrier, and the first operation includes any one of the following: determining a target reference signal according to a preset reference signal identifier, where the target reference signal is used for path loss measurement for the second object; and determining the target reference signal according to target control signaling on the first object.

16 Claims, 4 Drawing Sheets

(51) Int. Cl.
*H04W 72/23* (2023.01)
*H04W 72/25* (2023.01)

(56) References Cited

U.S. PATENT DOCUMENTS

| | | | |
|---|---|---|---|
| 2022/0132436 A1 | 4/2022 | Hoshino et al. | |
| 2024/0137937 A1* | 4/2024 | Matsumura ........... | H04L 5/0053 |

FOREIGN PATENT DOCUMENTS

| | | |
|---|---|---|
| WO | 2020166624 A1 | 8/2020 |
| WO | 2020190484 A1 | 9/2020 |
| WO | 2020191699 A1 | 10/2020 |

OTHER PUBLICATIONS

Ericsson, On V2X Sidelink Cross-Carrier Configuration, 3GPP TSG-RAN WG2 #96, Tdoc R2-168649, Nov. 14-18, 2016, Reno, Nevada, USA.
3rd Generation Partnership Project, Multiplexing and channel coding, 3GPP TS 38.212 V16.2.0 (Jun. 2020), Valbonne France.

* cited by examiner

REFERENCE SIGNAL DETERMINING METHOD, REFERENCE SIGNAL PROCESSING METHOD, AND RELATED DEVICE

CROSS-REFERENCE TO RELATED APPLICATIONS

This application is a continuation application of PCT International Application No. PCT/CN2021/123994 filed on Oct. 15, 2021, which claims priority to Chinese Patent Application No. 202011112977.4, filed in China on Oct. 16, 2020. All of the disclosures are incorporated herein by reference in their entireties.

TECHNICAL FIELD

This application relates to the field of communication technologies, and in particular, to a reference signal determining method, a reference signal processing method, and a related device.

BACKGROUND

With development of communication technologies, sidelink (SL) transmission has been realized in communication systems. In cross-carrier scheduling scenarios and carrier aggregation scenarios, SL resources of one cell can be scheduled by another cell to realize SL transmission. However, when there is no control signaling in the scheduled cell, a terminal cannot perform control power based on downlink path loss, resulting in poor transmission reliability.

SUMMARY

According to a first aspect, a reference signal determining method is provided, where the reference signal determining method is implemented by a terminal and includes:

implementing a first operation in a case that a first object schedules a resource of a second object for sidelink SL transmission/reception;

where the first object and the second object each are one of a cell, a frequency, and a carrier, and the first operation includes any one of the following:

determining a target reference signal according to a preset reference signal identifier, where the target reference signal is used for path loss measurement for the second object; and determining the target reference signal according to target control signaling on the first object.

According to a second aspect, a reference signal processing method is provided, where the reference signal processing method is implemented by a network device and includes:

transmitting, on a first object, target control signaling to a terminal in a case that the first object schedules a resource of a second object for sidelink SL transmission/reception, where the target control signaling is used for determining a target reference signal, and the target reference signal is used for path loss measurement for the second object.

According to a third aspect, a reference signal determining apparatus is provided and includes:

an execution module, configured to implement a first operation in a case that a first object schedules a resource of a second object for sidelink SL transmission/reception;

where the first object and the second object each are one of a cell, a frequency, and a carrier, and the first operation includes any one of the following:

determining a target reference signal according to a preset reference signal identifier, where the target reference signal is used for path loss measurement for the second object; and determining the target reference signal according to target control signaling on the first object.

According to a fourth aspect, a reference signal processing apparatus is provided and includes:

a transmitting module, configured to transmit, on a first object, target control signaling to a terminal in a case that the first object schedules a resource of a second object for sidelink SL transmission/reception, where the target control signaling is used for determining a target reference signal, and the target reference signal is used for path loss measurement for the second object.

According to a fifth aspect, a terminal is provided, where the terminal includes a processor, a memory, and a program or instructions stored in the memory and capable of running on the processor, and when the program or instructions are executed by the processor, the steps of the method according to the first aspect are implemented.

According to a sixth aspect, a network device is provided, where the network device includes a processor, a memory, and a program or instructions stored in the memory and capable of running on the processor, and when the program or instructions are executed by the processor, the steps of the method according to the second aspect are implemented.

According to a seventh aspect, a readable storage medium is provided, where a program or instructions are stored in the readable storage medium, and when the program or the instructions are executed by a processor, the steps of the method according to the first aspect are implemented, or the steps of the method according to the third aspect are implemented.

According to an eighth aspect, an embodiment of the application provides a chip, where the chip includes a processor and a communication interface, the communication interface is coupled to the processor, and the processor is configured to run a program or instructions on a network device to implement the method according to the second aspect.

According to a ninth aspect, a computer program product is provided, where the program product is stored in a non-volatile storage medium, and the program product is executed by at least one processor to implement the method according to the first aspect or the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that the data used in such a way is interchangeable in appropriate circumstances such that the embodiments of this application can be implemented in other orders than the order illustrated or described herein. Moreover, the objects distinguished by "first" and "second" are usually of one type, and the number of objects is not limited. For example, the number of the first object may be one or more. In addition, "and/or" in the specification and claims represents at least one of connected objects, and the character "/" generally indicates that the associated objects have an "or" relationship.

It should be noted that technologies described in the embodiments of this application are not limited to a long term evolution (LTE) or LTE-Advanced (LTE-A) system, and may also be applied to other wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communication system.

Figure 1:
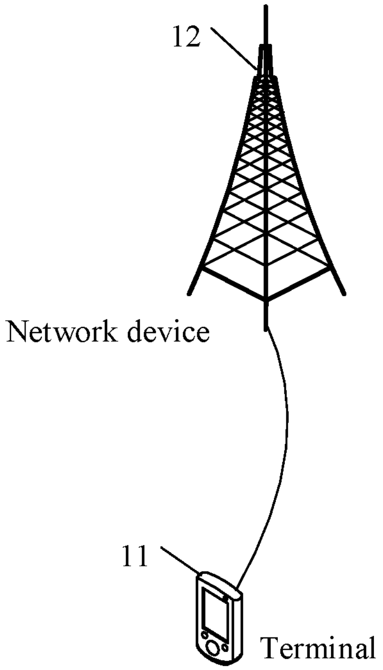
FIG. 1 is a structural diagram of a network system to which embodiments of this application may be applied.

FIG. 1 is a block diagram of a wireless communication system to which the embodiments of this application may be applied. The wireless communication system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (ultra-mobile personal computer, UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a wireless local area network (WLAN) access point, a wireless fidelity (WiFi) node, a transmission-reception point (TRP), or some other appropriate terms in the art. The base station is not limited to a specific technical term as long as the same technical effect is achieved. It should be noted that the base station in the NR system is taken merely as an example in the embodiments of this application, but the base station is not limited to any specific type.

For ease of understanding, the following describes some content involved in the embodiments of this application:

1. Cross-Carrier Scheduling

A 5G NR system supports configuration of one or more component carriers (CC) or cells for UE. In NR, both a primary cell (PCell) and a secondary cell (SCell) can be configured to be self-scheduled, but only Scell can be cross-carrier scheduled by a PCell or another SCell.

2. Carrier Aggregation

In order to meet the requirement that LTE-A has a downlink peak velocity of 1 Gbps and an uplink peak velocity of 500 Mbps, it is necessary to provide a transmission bandwidth as high as 100 MHz. However, for scarcity of a continuous frequency spectrum with such a large bandwidth, a carrier aggregation solution is proposed in LTE-A.

Carrier aggregation is aggregation between two or more component carriers to support a larger transmission bandwidth (up to 100 MHz). Actually, each component carrier corresponds to one independent cell. Usually, one component carrier is equivalent to one cell. A maximum bandwidth of each component carrier is 20 MHz. For efficient utilization of fragmented frequency spectra, carrier aggregation supports aggregation between different component carriers, specifically including the following situations:

component carriers with same or different bandwidths;

in a same band, neighboring or non-neighboring component carriers; and component carriers in different frequency bands.

3. SL Transmission/Reception

SL transmission/reception is used for direct data transmission between user equipments (User Equipment, UE) without using a network device.

UE transmits sidelink control information (SCI) over a physical sidelink control channel (PSCCH), to schedule a physical sidelink shared channel (PSSCH) for data transmission/reception. Such transmission is performed in a form of broadcast. A receiving end does not feed back whether reception is successful or not to a transmitting end.

LTE sidelink is designed to support two resource allocation modes: a scheduled resource allocation mode (typically referred to as mode-1) and an autonomous resource selection mode. In the former mode, a resource is allocated to each UE under control of a network-side device. In the latter mode, the UE autonomously selects a resource.

LTE supports sidelink carrier aggregation (CA). Differing from CA on a Uu interface (that is, downlink and uplink), CA on LTE sidelink does not differentiate between a primary component carrier (PCC) and a secondary component carrier (SCC). The UE in the autonomous resource selection mode independently performs resource sensing and resource reservation on each CC.

The design of LTE sidelink is applicable to specified public safety affairs (for example, emergency communication in disaster sites such as fire or earthquake), vehicle to everything (V2X) communication, or the like. Vehicle to everything communication includes various services, for example, basic security communication, advanced (autonomous) driving, platooning, sensor expansion, and so on. LTE sidelink supports only broadcast communication, and therefore is mainly used for basic security communication. Other advanced V2X services are supported by NR sidelink.

A 5G NR system may be used in a working band above 6 GHz that is not supported by LTE, and supports a larger working bandwidth. The NR system also supports sidelink interface communication for direct communication between terminals.

Sidelink transmission/reception mainly includes the following transmission/reception modes: broadcast, groupcast, and unicast. Unicast, as its name implies, is one-to-one transmission/reception. Groupcast is one-to-many transmission/reception. Broadcast is also one-to-many transmission/reception, but does not have a concept of UEs belonging to one group.

On a sidelink, a PSCCH carries SCI that is used for scheduling a PSSCH. Transmission resources may be indicated in the SCI, and these resources are reserved for future transmission. PSFCH is used for feeding back sidelink hybrid automatic repeat request acknowledgement (HARQ-ACK) information. After determining sidelink HARQ information, a user can further transmit the sidelink HARQ information to a base station over a PUCCH or PUSCH.

The following describes in detail a reference signal determining method provided in the embodiments of this application by using specific embodiments and application scenarios thereof with reference to the accompanying drawings.

Figure 2:
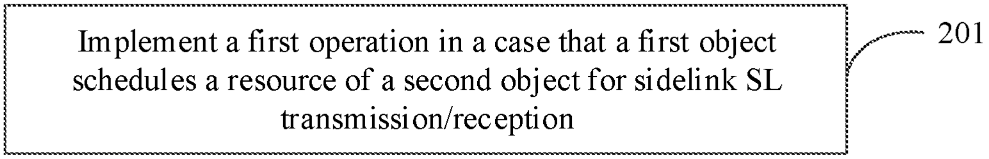
FIG. 2 is a flowchart of a reference signal determining method according to an embodiment of this application.

Refer to FIG. 2. FIG. 2 is a flowchart of a reference signal determining method according to an embodiment of this application. The method is implemented by a terminal, and as shown in FIG. 2, includes the following steps.

Step 201. Implement a first operation in a case that a first object schedules a resource of a second object for sidelink SL transmission/reception.

The first object and the second object each are one of a cell, a frequency, and a carrier, and the first operation includes any one of the following:

- determining a target reference signal according to a preset reference signal identifier, where the target reference signal is used for path loss measurement for the second object; and
- determining the target reference signal according to target control signaling on the first object.

In this embodiment of this application, the first object scheduling the resource of the second object for sidelink SL transmission/reception can be construed as that a resource indicated, configured or scheduled by using target control signaling on the first object is the resource on the second object, and the SL transmission/reception is performed based on the indicated, configured or scheduled resource. The SL transmission/reception can be construed as SL transmission and/or reception. It should be understood that when the second object is a cell, the second object may also be referred to as an SL cell; when the second object is a frequency, the second object may also be referred to as an SL frequency; and when the second object is a carrier, the second object may also be referred to as an SL carrier.

The target reference signal is used for path loss measurement for the second object. It can be understood that a path loss result based on this target reference signal measurement is used for representing a path loss measurement result of the second object. The first operation can be construed as an operation for determining a target reference signal, and the target reference signal is used for path loss measurement for the second object. It should be understood that in this embodiment of this application, the path loss measurement may be performed based on the target reference signal before the first operation or after the first operation. In other words, the first operation can be construed as determining a path loss corresponding to the SL transmission/reception, to be specific, the path loss corresponding to the SL transmission/reception may be determined based on a determined target reference signal.

Optionally, the preset reference signal identifier can be construed as an index or an identifier of a reference signal. For example, the preset reference signal identifier may be represented as a PUSCH path loss reference signal identifier (PUSCH-PathlossReferenceRS-Id), or a sounding reference signal path loss reference signal identifier (SRS-Pathloss-ReferenceRS-Id). It should be understood that in this embodiment of this application, the preset reference signal identifier may be prescribed by a protocol. For example, an identifier value corresponding to a preset reference signal identifier that can be prescribed by a protocol may be a maximum, minimum, or specified identifier value.

Optionally, the preset reference signal identifier may be an identifier associated with a preset sounding reference signal (SRS) resource set. For example, in an SRS resource set 0, an identifier of the preset reference signal is associated with the SRS resource set 0. In this case, the target reference signal may be construed as an RS in the SRS resource set 0, namely, an RS corresponding to SRS-ResourceSetId=0. In this embodiment of this application, in the case that the first object schedules the resource of the second object for sidelink SL transmission/reception, the target reference signal is determined according to the preset reference signal identifier or the target control signaling on the first object, such that a path loss measurement result obtained based on reference signal measurement corresponding to the target reference signal can be used as the path loss measurement result of the second object, thereby realizing power control based on downlink path loss on the second object. Therefore, this embodiment of this application can improve the transmission reliability.

Optionally, in some embodiments, the preset reference signal identifier satisfies at least one of the following:

- in a case that the terminal is provided with at least one first reference signal on the second object, the preset reference signal identifier corresponds to one such first reference signal; and
- in a case that the terminal is provided with no first reference signal on the second object, the preset reference signal identifier corresponds to one second reference signal of the first object.

When the second object is provided with at least one first reference signal, an identifier corresponding to the first reference signal is used as the preset reference signal identifier, such that path loss measurement can be performed based on the first reference signal on the second object, thereby guaranteeing accuracy of path loss measured. When the second object is provided with no first reference signal, an identifier corresponding to a second reference signal on the first object may be used as the preset reference signal identifier, such that failure of power control caused by failure of path loss measurement for the second object can be avoided. The second reference signal is used for path loss measurement to realize power control on the second object, thereby improving transmission reliability on the second object.

Optionally, the determining the target reference signal according to target control signaling on the first object may be construed as indicating or implicitly indicating the target reference signal by the network device by using the target control signaling sent on the first object. After receiving the target control signaling, the terminal may determine the target reference signal according to the target control signaling.

Optionally, in some embodiments, the target control signaling satisfies at least any one of the following:

condition 1, the target control signaling is latest control signaling received before the SL transmission/reception;

condition 2, a receiving time of the target control signaling is before a start time of the SL transmission/reception, and an interval between the receiving time of the target control signaling and the start time of the SL transmission/reception is longer than N time units, where N is a positive integer greater than 1;

condition 3, the target control signaling is control signaling received in a preset frame, a preset subframe, a preset slot, or a preset measurement window; and condition 4, the target control signaling is control signaling scrambled by a preset radio network temporary identifier (RNTI).

In these embodiments of this application, the control signaling may be in a format of downlink control information (DCI) 0-X, or DCI 3-Y, or radio resource control (RRC), or a medium access control element (MAC CE), or another higher-layer signaling. In other words, the target control signaling may be first downlink control information DCI, second DCI, radio resource control RRC, or a medium access control element MAC CE, where the first DCI and the second DCI differ in type.

The first DCI may be DCI corresponding to DCI 0-X, and the second DCI may be DCI corresponding to DCI 3-Y. Optionally, values of X and Y may be set based on actual needs. For example, in some embodiments, the value of X is 1 or 2, and the value of Y is 0 or 1.

It should be noted that when the target reference signal is indicated by using the target control signaling, the target reference signal may be indicated by using RRC signaling, and may also be updated by MAC CE later.

According to the condition 2, the time unit may be construed as time units such as frame, subframe, slot, second, and millisecond. Using slot as an example, there are at least N slots between the scheduled SL transmission/reception and the target control signaling.

According to the condition 3, using a preset frame as an example, the target control signaling may be specifically construed as control signaling received in a frame corresponding to a system frame number (SFN) 0.

According to the condition 4, when the controlling signaling is DCI 0-X, the preset RNTI may be one of the following: a cell radio network temporary identifier (C-RNTI), a configured scheduling radio network temporary identifier (CS-RNTI), a semi-persistent channel state information radio network temporary identifier (SP-CSI-RNTI), and a modulation and coding scheme cell radio network temporary identifier (MCS-C-RNTI). When the control signaling is DCI 3-Y, the preset RNTI may be an SL-RNTI or an SL-CS-RNTI.

Optionally, the another higher-layer signaling may be configured grant configuration signaling.

Optionally, in some embodiments, when the target control signaling is the first DCI, the determining the target reference signal according to target control signaling on the first object includes at least one of the following:

in a case that the first DCI carries a first indicator field, determining the target reference signal according to indication information of the first indicator field; and in a case that the first DCI carries no first indicator field, determining the target reference signal according to the preset reference signal identifier.

The first DCI may be construed as DCI in a format of DCI 0-X. The first DCI carrying a first indicator field may be construed as that the first DCI includes a first indicator field, where the first indicator field includes indication information. In these embodiments of this application, the indication information of the first indicator field may be construed as a value of the first indicator field. The indication information is used for determining the target reference signal. For example, the indication information carried in the first indicator field may be an identifier of a target reference signal, and the terminal may determine the target reference signal based on the identifier. When the first DCI carries no first indicator field, the terminal may directly determine the target reference signal according to the preset reference signal identifier. Specifically, for the determining the target reference signal according to the preset reference signal identifier, reference may be made to the descriptions of the foregoing embodiments, which is not described herein again.

In these embodiments of this application, the first indicator field may be a sounding reference signal resource indicator (SRI) field.

Optionally, in some embodiments, when the target control signaling is the second DCI, the determining the target reference signal according to target control signaling on the first object includes at least one of the following:

determining a physical downlink control channel (PDCCH) demodulation reference signal (DMRS) corresponding to the second DCI as the target reference signal; and determining the target reference signal according to a second indicator field carried in the second DCI.

The second DCI may be construed as DCI carrying the second indicator field, and the second DCI differs from the first DCI. The following embodiments are described by using an example in which the second DCI represents DCI with a format of DCI 3-Y. In this case, the second DCI includes the second indicator field, which can be understood that the second indicator field is added to the second DCI, and that the target reference signal may be indicated based on a value of the second indicator field. When no second indicator field is added to the second DCI, the PDCCH DMRS corresponding to the second DCI may be used as the target reference signal.

In these embodiments of this application, the first indicator field may be a sounding reference signal resource indicator field.

Optionally, in some embodiments, there is no control signaling on the second object.

In these embodiments of this application, for the second object with control signaling, the target reference signal may be determined by using the control signaling on the second object. For only the second object with no control signaling, the target reference signal may be determined by using the first operation in this application. For example, a DCI format 0-0 may be a DCI format 0-0 in a cell in which an SL resource is located, or may alternatively be a DCI format 0-0 in a scheduled cell (that is, a cell in which SL DCI is located).

For example, the terminal may determine power $P_{S\text{-}SSB}(i)$ of a transmission/reception occasion of a sidelink synchronization signal block (S-SSB) in slot i in the following manners:

$$P_{S-SSB}(i)=\min\left(P_{CMAX},\,P_{0,S-SSB}+10\log_{10}\left(2^{\mu}\cdot M_{RB}^{S-SSB}\right)+\alpha_{S-SSB}\cdot PL\right);$$

$P_{CMAX}$ is a maximum transmit power supported by a user; $P_{O,S\text{-}SSB}$ is a value (if provided) of p0-DL-S-SSB; otherwise, $P_{S\text{-}SSB}(i)=P_{CMAX}$; $\alpha_{S\text{-}SSB}$ is a value (if provided) of alpha-DL-S-SSB; otherwise, $\alpha_{S\text{-}SSB}=1$; PL is a path loss value corresponding to the transmission/reception; and $$M_{RB}^{S-SSB}=11,$$

which is a quantity of radio bearers (RB) included in one S-SSB transmission/reception under a sub-carrier space (SCS) configuration.

Optionally, in some embodiments, $PL=PL_{b,f,c}(q_d)$, to be specific, PL is a downlink path loss calculated by the terminal by using a reference signal with an index of $q_d$ for an activated downlink bandwidth part of a carrier f of a serving cell c, measured in dB.

Further, the target reference signal may include at least one of the following:

- in a case that the terminal is configured to monitor a PDCCH to detect for a DCI format 0-0, the terminal is configured to determine an RS resource corresponding to a PUSCH transmission/reception power scheduled by the DCI format 0-0; and
- in a case that the terminal is not configured to monitor a PDCCH to detect for a DCI format 0-0, the terminal is configured to obtain an RS resource corresponding to an SSB of a master information block (MIB).

Optionally, in these embodiments of this application, the DCI format 0-0 may be DCI format 0-0 in a cell in which an SL resource is located, or may alternatively be DCI format 0-0 in a scheduled cell (that is, a cell in which SL DCI is located).

Certainly, in some embodiments, no matter whether there is a control signal on the second object or not, the target reference signal may be determined by using the first operation. In other words, in some embodiments, all target reference signals used for determining a path loss on non-self-scheduled second object may be determined by using the first operation.

Optionally, in some embodiments, in a case that the first object is a cell, the first object is a primary cell or a secondary cell.

In these embodiments of this application, in a cross-carrier scheduling application scenario, at least two cells exist, and a first cell indicates, configures, or schedules an SL resource of a second cell for transmission/reception, where the first cell may be construed as the first object, and the second cell may be construed as the second object. Optionally, in some embodiments, the second cell is an SCell with no control signaling, and the first cell is a Pcell or an SCell.

It should be understood that, similarly, in a case that the first object is a frequency, the first object is a primary frequency or a secondary frequency. In a case that the first object is a carrier, the first object is a primary carrier or a secondary carrier. It should be noted that the primary and secondary are defined based on corresponding functions, where the primary frequency and the primary carrier correspond to the primary cell, and the secondary frequency and the secondary carrier correspond to the secondary cell.

Optionally, in some embodiments, in a case that the terminal is configured with at least two objects, at least some of the at least two objects use the same target reference signal, and the at least two objects include the first object and the second object.

In these embodiments of this application, in an SL carrier aggregation application scenario, an example in which the second object is an SL cell is used for description. In this case, at least two SL cells exist, and the SL cells may have the same or different reference signal configurations for downlink path loss measurement. For example, the terminal uses the same reference signal configuration in at least some of the SL cells, and the reference signal configuration is used for determining the target reference signal for path loss measurement.

It should be understood that the SL cells may be scheduled (cross-carrier scheduled) by another cell, or may be self-scheduled, or some of the SL cells are self-scheduled, and the others are scheduled by another cell.

For better understanding of this application, the following describes implementation of this application in detail by using some embodiments. Embodiment 1: In a cross-carrier scheduling scenario, in the case that the target reference signal is determined according to the preset reference signal identifier, the following two schemes are provided.

Scheme 1, assuming that the second cell is an SL cell, the first cell schedules SL transmission/reception on the second cell, and UE is configured, according to parameter PUSCH-PathlossReferenceRS, with four reference signal resource indexes and reference signal configuration sets corresponding to the indexes in the second cell, where each of the reference signal resource index sets may include at least one of a synchronization signal block (Synchronization Signal and PBCH block, SSB) index set and a CSI-RS resource index set that are provided by parameter ssb-Index and parameter csi-RS-Index respectively. In this case, the UE selects a reference signal corresponding to identifier 0 in the PUSCH-PathlossReferenceRS (pusch-PathlossReferenceRS-Id=0) for downlink path loss measurement for SL transmission/reception power control.

Scheme 2, assuming that the second cell is an SL cell, the first cell schedules SL transmission/reception on the second cell, and UE is configured with no reference signal on the second cell, the UE selects a reference signal corresponding to pusch-PathlossReferenceRS-Id=0 in a reference signal of the first cell for downlink path loss measurement for SL transmission/reception power control.

Embodiment 2: In a cross-carrier scheduling scenario, in the case that the target reference signal is determined according to the preset reference signal identifier, assuming that the second cell is an SL cell, the first cell schedules SL transmission/reception on the second cell, and UE is provided with SRS resource index-PUSCH power control (SRI-PUSCH-PowerControl) and more than one PUSCH-PathlossReferenceRS-Id value, the UE obtains, from an SRS resource index-PUSCH power control identifier (sri-PUSCH-PowerControlId) in the SRI-PUSCH-PowerControl, a mapping from an SRI indicator field of DCI for scheduling PUSCH transmission/reception to the PUSCH-PathlossReferenceRS-Id value, and determines a reference signal for downlink path loss measurement for SL transmission/reception power control based on a value of the PUSCH-PathlossReferenceRS-Id.

Embodiment 3: In a carrier aggregation scenario, in the case that the target reference signal is determined based on control signaling of the first object, the following two schemes are provided.

Scheme 3: Assuming that the first cell schedules SL transmission/reception on the first SL cell, the second SL cell uses the same reference signal configuration as the first SL cell for downlink path loss measurement for SL transmission/reception power control. In a case that PUSCH transmission/reception on the first cell is configured with configured grant configuration (ConfiguredGrantConfig) and that the ConfiguredGrantConfig includes RRC configured uplink grant (rrc-ConfiguredUplinkGrant), a value of a reference signal index such as a path loss reference index (pathlossReferenceIndex) is to be provided by the rrc-ConfiguredUplinkGrant, and UE performs, based on a corresponding reference signal, downlink path loss measurement for SL transmission/reception power control.

Scheme 4: Assuming that the first cell schedules SL transmission/reception on the first SL cell, the second SL cell uses the same reference signal configuration as the first SL cell for downlink path loss measurement for SL transmission/reception power control. In a case that the PUSCH transmission/reception on the first cell is configured with the ConfiguredGrantConfig and that the ConfiguredGrantConfig includes no rrc-ConfiguredUplinkGrant, the UE determines a reference signal index value PUSCH-PathlossReferenceRS-Id based on a value of an SRI indicator field in DCI for activating PUSCH transmission/reception. If the DCI for activating PUSCH transmission/reception includes no SRI indicator field, the UE selects a reference signal corresponding to PUSCH-PathlossReferenceRS-Id=0.

Figure 3:
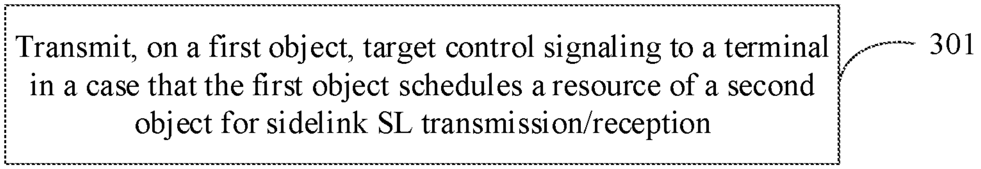
FIG. 3 is a flowchart of a reference signal processing method according to an embodiment of this application.

Referring to FIG. 3, FIG. 3 is a flowchart of a reference signal processing method according to an embodiment of this application. The method is implemented by a network device, and as shown in FIG. 3, includes the following steps.

Step 301. Transmit, on a first object, target control signaling to a terminal in a case that the first object schedules a resource of a second object for sidelink SL transmission/reception, where the target control signaling is used for determining a target reference signal, and the target reference signal is used for path loss measurement for the second object.

Optionally, the target control signaling satisfies at least any one of the following:

- the target control signaling is the latest control signaling received before the SL transmission/reception;
- a receiving time of the target control signaling is before a start time of the SL transmission/reception, and an interval between the receiving time of the target control signaling and the start time of the SL transmission/reception is longer than N time units, where N is a positive integer greater than 1;
- the target control signaling is control signaling received in a preset frame, a preset subframe, a preset slot, or a preset measurement window; and
- the target control signaling is control signaling scrambled by a preset radio network temporary identifier.

Optionally, the target control signaling is first downlink control information DCI, second DCI, radio resource control RRC, or a medium access control element MAC CE, where the first DCI and the second DCI differ in type.

Optionally, when the target control signaling is the first DCI, the determining the target reference signal according to target control signaling on the first object includes at least one of the following:

- in a case that the first DCI carries a first indicator field, determining the target reference signal according to indication information of the first indicator field; and
- in a case that the first DCI carries no first indicator field, determining the target reference signal according to the preset reference signal identifier.

Optionally, the first indicator field may be a sounding reference signal resource indicator field.

Optionally, when the target control signaling is the second DCI, the determining the target reference signal according to target control signaling on the first object includes any one of the following:

- determining a physical downlink control channel demodulation reference signal corresponding to the second DCI as the target reference signal; and
- determining the target reference signal according to a second indicator field carried in the second DCI.

Optionally, the second indicator field is a sounding reference signal resource indicator field.

Optionally, the preset reference signal identifier satisfies at least one of the following: in a case that the terminal is provided with at least one first reference signal on the second object, the preset reference signal identifier corresponds to one such first reference signal; and in a case that the terminal is provided with no first reference signal on the second object, the preset reference signal identifier corresponds to one second reference signal of the first object.

Optionally, there is no control signaling on the second object.

Optionally, in a case that the first object is a cell, the first object is a primary cell or a secondary cell.

Optionally, in a case that the terminal is configured with at least two objects, at least some of the at least two objects use the same target reference signal, and the at least two objects include the first object and the second object.

It should be noted that this embodiment is used as an implementation of the network device corresponding to the embodiment shown in FIG. 2. For a specific implementation of this embodiment, reference may be made to the related descriptions of the embodiment shown in FIG. 2, with the same beneficial effect achieved. To avoid repetition, details are not described herein again.

It should be noted that the reference signal determining method according to the embodiments of this application may be implemented by a reference signal determining apparatus or a control module for implementing the reference signal determining method in the reference signal determining apparatus. The reference signal determining apparatus provided in the embodiments of this application is described by using an example in which the reference signal determining apparatus implements the reference signal determining method according to the embodiments of this application.

Figure 4:
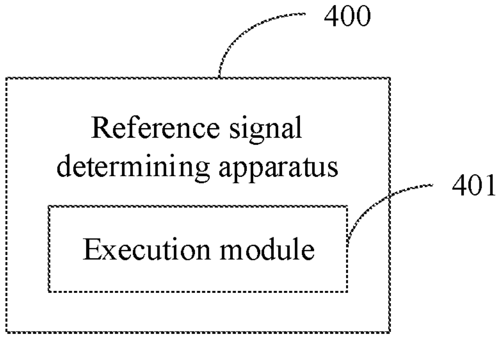
FIG. 4 is a structural diagram of a reference signal determining apparatus according to an embodiment of this application.

Referring to FIG. 4, FIG. 4 is a structural diagram of a reference signal determining apparatus according to an embodiment of this application. As shown in FIG. 4, the reference signal determining apparatus 400 includes:

- an execution module 401, configured to implement a first operation in a case that a first object schedules a resource of a second object for sidelink SL transmission/reception;
- where the first object and the second object each are one of a cell, a frequency, and a carrier, and the first operation includes any one of the following:

determining a target reference signal according to a preset reference signal identifier, where the target reference signal is used for path loss measurement for the second object; and determining the target reference signal according to target control signaling on the first object.

Optionally, the preset reference signal identifier satisfies at least one of the following:

when a terminal is provided with at least one first reference signal on the second object, the preset reference signal identifier corresponds to one such first reference signal; and in a case that the terminal is provided with no first reference signal on the second object, the preset reference signal identifier corresponds to one second reference signal of the first object.

Optionally, the target control signaling satisfies at least any one of the following:

the target control signaling is the latest control signaling received before the SL transmission/reception;

a receiving time of the target control signaling is before a start time of the SL transmission/reception, and an interval between the receiving time of the target control signaling and the start time of the SL transmission/reception is longer than N time units, where N is a positive integer greater than 1;

the target control signaling is control signaling received in a preset frame, a preset subframe, a preset slot, or a preset measurement window; and the target control signaling is control signaling scrambled by a preset radio network temporary identifier.

Optionally, the target control signaling is first downlink control information DCI, second DCI, radio resource control RRC, or a medium access control element MAC CE, where the first DCI and the second DCI differ in type.

Optionally, when the target control signaling is the first DCI, the determining the target reference signal according to target control signaling on the first object includes at least one of the following:

in a case that the first DCI carries a first indicator field, determining the target reference signal according to indication information of the first indicator field; and in a case that the first DCI carries no first indicator field, determining the target reference signal according to the preset reference signal identifier.

Optionally, the first indicator field may be a sounding reference signal resource indicator field.

Optionally, when the target control signaling is the second DCI, the determining the target reference signal according to target control signaling on the first object includes any one of the following:

determining a physical downlink control channel demodulation reference signal corresponding to the second DCI as the target reference signal; and determining the target reference signal according to a second indicator field carried in the second DCI.

Optionally, the second indicator field is a sounding reference signal resource indicator field.

Optionally, there is no control signaling on the second object.

Optionally, in a case that the first object is a cell, the first object is a primary cell or a secondary cell.

Optionally, in a case that the terminal is configured with at least two objects, at least some of the at least two objects use the same target reference signal, and the at least two objects include the first object and the second object.

The reference signal determining apparatus according to the embodiments of this application can implement the processes implemented by the terminal in the method embodiment in FIG. 2. To avoid repetition, details are not described herein again.

It should be noted that the reference signal determining method according to the embodiments of this application may be implemented by a reference signal determining apparatus or a control module for implementing the reference signal determining method in the reference signal determining apparatus. The reference signal determining apparatus provided in the embodiments of this application is described by using an example in which the reference signal determining apparatus implements the reference signal determining method according to the embodiments of this application.

It should be noted that the reference signal processing method according to the embodiments of this application may be implemented by a reference signal determining apparatus or a control module for implementing the reference signal processing method in the reference signal determining apparatus. The reference signal determining apparatus provided in the embodiments of this application is described by using an example in which the reference signal determining apparatus implements the reference signal processing method according to the embodiments of this application.

Figure 5:
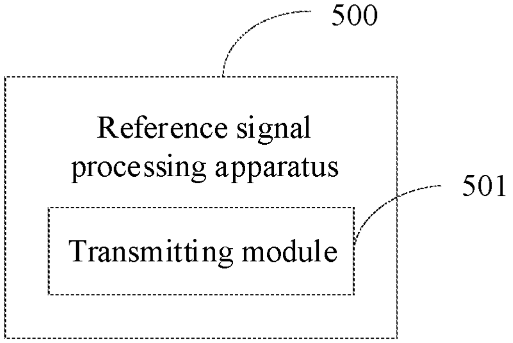
FIG. 5 is a structural diagram of a reference signal processing apparatus according to an embodiment of this application.

Referring to FIG. 5, FIG. 5 is a structural diagram of a reference signal processing apparatus according to an embodiment of this application. As shown in FIG. 5, the reference signal processing apparatus 500 includes:

a transmitting module 501, configured to transmit, on a first object, target control signaling to a terminal in a case that the first object schedules a resource of a second object for sidelink SL transmission/reception, where the target control signaling is used for determining a target reference signal, and the target reference signal is used for path loss measurement for the second object.

Optionally, the target control signaling satisfies at least any one of the following:

the target control signaling is the latest control signaling received before the SL transmission/reception;

a receiving time of the target control signaling is before a start time of the SL transmission/reception, and an interval between the receiving time of the target control signaling and the start time of the SL transmission/reception is longer than N time units, where N is a positive integer greater than 1;

the target control signaling is control signaling received in a preset frame, a preset subframe, a preset slot, or a preset measurement window; and the target control signaling is control signaling scrambled by a preset radio network temporary identifier.

Optionally, the target control signaling is first downlink control information DCI, second DCI, radio resource control RRC, or a medium access control element MAC CE, where the first DCI and the second DCI differ in type.

Optionally, when the target control signaling is the first DCI, the determining the target reference signal according to target control signaling on the first object includes at least one of the following:

in a case that the first DCI carries a first indicator field, determining the target reference signal according to indication information of the first indicator field; and in a case that the first DCI carries no first indicator field, determining the target reference signal according to the preset reference signal identifier.

Optionally, the first indicator field may be a sounding reference signal resource indicator field.

Optionally, when the target control signaling is the second DCI, the determining the target reference signal according to target control signaling on the first object includes any one of the following:

determining a physical downlink control channel demodulation reference signal corresponding to the second DCI as the target reference signal; and determining the target reference signal according to a second indicator field carried in the second DCI.

Optionally, the second indicator field is a sounding reference signal resource indicator field.

Optionally, the preset reference signal identifier satisfies at least one of the following: in a case that the terminal is provided with at least one first reference signal on the second object, the preset reference signal identifier corresponds to one such first reference signal; and in a case that the terminal is provided with no first reference signal on the second object, the preset reference signal identifier corresponds to one second reference signal of the first object.

Optionally, there is no control signaling on the second object.

Optionally, in a case that the first object is a cell, the first object is a primary cell or a secondary cell.

Optionally, in a case that the terminal is configured with at least two objects, at least some of the at least two objects use the same target reference signal, and the at least two objects include the first object and the second object.

The reference signal processing apparatus provided in this embodiment of this application can implement the processes that are implemented by the network device in the method embodiment of FIG. 3. To avoid repetition, details are not described herein again.

The reference signal determining apparatus and the reference signal processing apparatus according to the embodiments of this application may be apparatuses, or alternatively may be components, integrated circuits, or chips in a terminal. The apparatuses may be mobile terminals or non-mobile terminals. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The reference signal determining apparatus and the reference signal processing apparatus according to the embodiments of this application may each be an apparatus having an operating system. The operating system may be an Android operating system, an iOS operating system, or other possible operating systems, and is not specifically limited in the embodiments of this application.

The reference signal determining apparatus and the reference signal processing apparatus according to the embodiments of this application can implement the processes implemented in the method embodiments in FIG. 2 and FIG. 3, with the same technical effects achieved. To avoid repetition, details are not described herein again.

Figure 6:
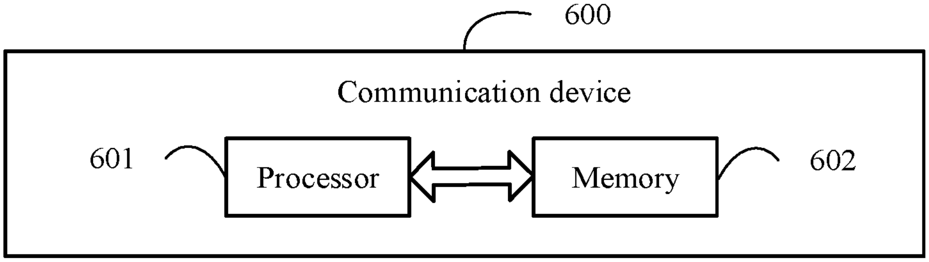
FIG. 6 is a structural diagram of a communication device according to an embodiment of this application.

Optionally, as shown in FIG. 6, an embodiment of this application further provides a communication device 600 including a processor 601, a memory 602, and a program or instructions stored in the memory 602 and executable on the processor 601. For example, when the communication device 600 is a terminal, the program or instructions are executed by the processor 601, the processes of the foregoing reference signal determining method embodiment are implemented, with same technical effects achieved. When the communication device 600 is a network-side device and when the program or instructions are executed by the processor 601, the processes of the foregoing reference signal processing method embodiment are implemented, with same technical effects achieved. To avoid repetition, details are not described herein again.

Figure 7:
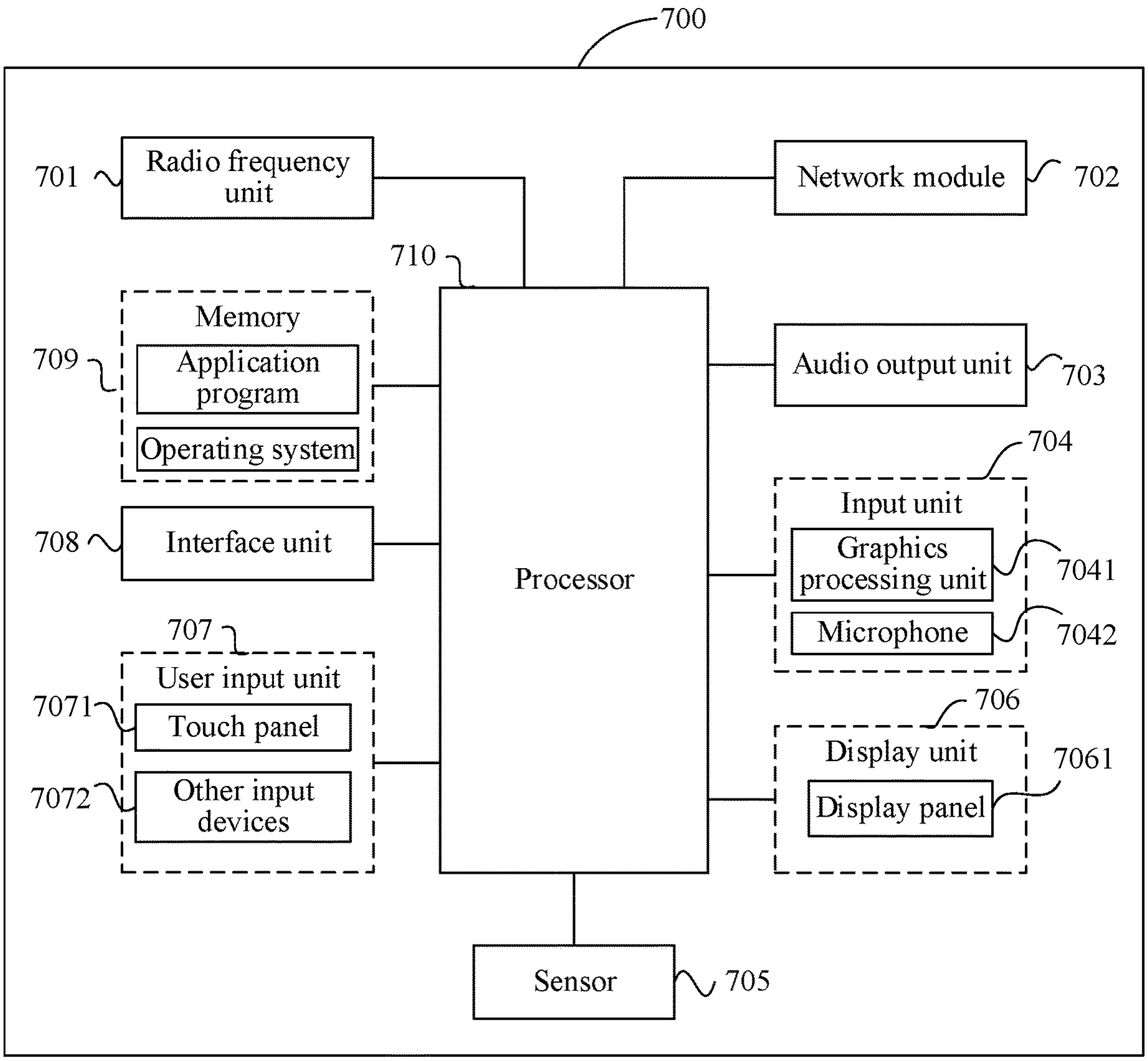
FIG. 7 is a structural diagram of a terminal according to an embodiment of this application.

FIG. 7 is a schematic diagram of a hardware structure of a terminal for implementing the embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal 700 may further include a power supply (for example, a battery) supplying power to the components, and the power supply may be logically connected to the processor 710 through a power management system. In this way, functions such as charge management, discharge management, and power consumption management are implemented by using the power management system. The structure of the terminal shown in FIG. 7 does not constitute any limitation on the terminal. The terminal may include more or fewer components than shown in FIG. 7, or a combination of some components, or the components disposed differently. Details are not described herein again.

It should be understood that in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, and the like. The user input unit 707 may include a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or a power on/off key), a trackball, a mouse, and a joystick. Details are not described herein again.

In this embodiment of this application, the radio frequency unit 701 receives downlink data from a network-side device, then transmits the downlink data to the processor 710 for processing, and also transmits uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may mainly include a program or instruction storage region and a data storage region. The program or instruction storage region may store an operating system, an application program or instructions required by at least one function (for example, an audio play function or an image play function), and the like. In addition, the memory 709 may include a high-speed random access memory, and may further include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash storage device, or another volatile solid-state storage device.

The processor 710 may include one or more processing units. Optionally, an application processor and a modem processor may be integrated in the processor 710. The application processor primarily processes an operating system, a user interface, an application program or instructions, and the like. The modem processor primarily processes radio communication. For example, the modern processor may be a baseband processor. It can be understood that the modem processor may alternatively be not integrated in the processor 710.

The processor 710 is configured to implement a first operation in a case that a first object schedules a resource of a second object for sidelink SL transmission/reception; where the first object and the second object each are one of a cell, a frequency, and a carrier, and the first operation includes any one of the following:

determining a target reference signal according to a preset reference signal identifier, where the target reference signal is used for path loss measurement for the second object; and determining the target reference signal according to target control signaling on the first object.

It should be understood that in this embodiment, the processor 710 and the radio frequency unit 701 are capable of implementing the processes implemented by the terminal in the method embodiment in FIG. 2. To avoid repetition, details are not described herein again.

Figure 8:
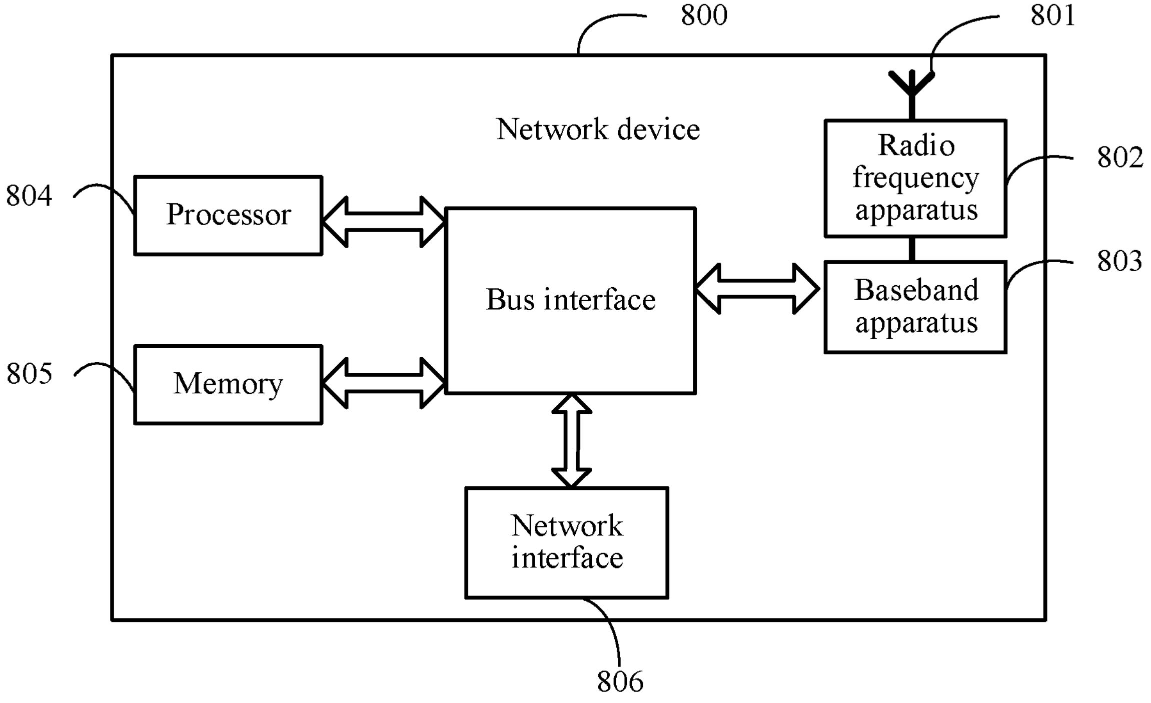
FIG. 8 is a structural diagram of a network device according to an embodiment of this application.

Specifically, an embodiment of this application further provides a network-side device. As shown in FIG. 8, the network device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and transmits the received information to the baseband apparatus 803 for processing. In a downlink direction, the baseband apparatus 803 processes to-be-sent information, and transmits the information to the radio frequency apparatus 802; and the radio frequency apparatus 802 processes the received information and then transmits the information out by using the antenna 801.

The method performed by the network-side device in the foregoing embodiments may be implemented in the baseband apparatus 803, and the baseband apparatus 803 includes a processor 804 and a memory 805.

The baseband apparatus 803 may include, for example, at least one baseband board, where a plurality of chips are disposed on the baseband board. As shown in FIG. 8, one of the chips is, for example, the processor 804 connected to the memory 805, to invoke a program in the memory 805 to perform the operation of the network device shown in the foregoing method embodiment.

The baseband apparatus 803 may further include a network interface 806 configured to exchange information with the radio frequency apparatus 802, where the interface is, for example, a common public radio interface (CPRI for short).

Specifically, the network-side device according to this embodiment of this application further includes: instructions or a program stored in the memory 805 and capable of running on the processor 804. The processor 804 invokes the instructions or program in the memory 805 to implement the method implemented by the modules shown in FIG. 5, with same technical effects achieved. To avoid repetition, details are not described herein again.

An embodiment of this application further provides a readable storage medium, where a program or instructions are stored in the readable storage medium. When the program or instructions are executed by a processor, the processes of the foregoing reference signal determining method or reference signal processing method embodiment can be implemented, with same technical effects achieved. To avoid repetition, details are not described herein again.

The processor is a processor in the electronic device described in the foregoing embodiments. The readable storage medium includes a computer-readable storage medium, such as a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions of a network device to implement the processes of the foregoing reference signal processing method embodiments, with same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to implementing the functions in an order shown or discussed, but may also include implementing the functions in a substantially simultaneous manner or in a reverse order, depending on the functions involved. For example, the described methods may be performed in an order different from that described, and various steps may alternatively be added, omitted, or combined. In addition, features described with reference to some examples may be combined in other examples.

According to the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the method described in each embodiment of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A reference signal determining method, performed by a terminal, comprising:

implementing a first operation in a case that a first object schedules or configures a resource of a second object for sidelink (SL) transmission/reception;

wherein the first object and the second object each is a cell, and the first operation comprises:

determining a target reference signal corresponding to power of a physical uplink shared channel (PUSCH) transmission scheduled by a target control signaling on the first object, wherein the target reference signal is used for path loss measurement for the second object, wherein the target control signaling is downlink control information (DCI) format 0_0, the first object is a cell that schedules an SL resource, and the second object is a cell where the SL resource is located, wherein the reference signal determining method further comprises: performing power control based on the path loss measurement for the second object.

2. The method according to claim 1, wherein the target control signaling satisfies at least any one of the following:

the target control signaling is the latest control signaling received before the SL transmission/reception;

a receiving time of the target control signaling is before a start time of the SL transmission/reception, and an interval between the receiving time of the target control signaling and the start time of the SL transmission/reception is longer than N time units, wherein N is a positive integer greater than 1;

the target control signaling is control signaling received in a preset frame, a preset subframe, a preset slot, or a preset measurement window; and the target control signaling is control signaling scrambled by a preset radio network temporary identifier.

3. The method according to claim 1, wherein the determining the target reference signal according to target control signaling on the first object comprises:

in a case that the first DCI carries a first indicator field, determining the target reference signal according to indication information of the first indicator field;

wherein the first indicator field is a sounding reference signal resource indicator field.

4. The method according to claim 1, wherein when the target control signaling is the second DCI, the determining the target reference signal according to target control signaling on the first object comprises any one of the following:

determining a physical downlink control channel demodulation reference signal corresponding to the second DCI as the target reference signal; and determining the target reference signal according to a second indicator field carried in the second DCI.

5. The method according to claim 4, wherein the second indicator field is a sounding reference signal resource indicator field.

6. The method according to claim 1, wherein in a case that the first object is a cell, the first object is a primary cell or a secondary cell.

7. The method according to claim 1, wherein in a case that the terminal is configured with at least two objects, at least some of the at least two objects use the same target reference signal, and the at least two objects comprise the foregoing first object and second object.

8. The method according to claim 1, wherein the first object and the second object are the same.

9. The method according to claim 1, wherein the method further comprises:

determining power of the SL transmission/reception based on a path loss corresponding to the target reference signal.

10. A reference signal processing method, performed by a network device, comprising:

transmitting, on a first object, target control signaling to a terminal in a case that the first object schedules or configures a resource of a second object for sidelink (SL) transmission/reception, wherein the target control signaling is used for determining a target reference signal, and the target reference signal is used for path loss measurement for the second object, and power control is performed based on the path loss measurement for the second object, wherein the first object and the second object each is a cell, wherein the target control signaling is downlink control information (DCI) format 0_0, the first object is a cell that schedules an SL resource, and the second object is a cell where the SL resource is located, the target reference signal is a reference signal used for the terminal to determine power of a physical uplink shared channel (PUSCH) transmission scheduled by the first DCI on the first object.

11. The method according to claim 10, wherein the target control signaling satisfies at least any one of the following:

the target control signaling is the latest control signaling received before the SL transmission/reception;

a receiving time of the target control signaling is before a start time of the SL transmission/reception, and an interval between the receiving time of the target control signaling and the start time of the SL transmission/reception is longer than N time units, wherein N is a positive integer greater than 1;

the target control signaling is control signaling received in a preset frame, a preset subframe, a preset slot, or a preset measurement window; and the target control signaling is control signaling scrambled by a preset radio network temporary identifier.

12. The method according to claim 10, wherein the target control signaling is the first DCI, second DCI, radio resource control RRC, or a medium access control element MAC CE, wherein the first DCI and the second DCI differ in type, the second DCI is DCI corresponding to DCI 3_Y, and a value of Y is 0 or 1.

13. The method according to claim 12, wherein when the target control signaling is the second DCI, the determining the target reference signal according to target control signaling on the first object comprises any one of the following:

determining a physical downlink control channel demodulation reference signal corresponding to the second DCI as the target reference signal; and determining the target reference signal according to a second indicator field carried in the second DCI.

14. The method according to claim 10, wherein the determining the target reference signal according to target control signaling on the first object comprises:

in a case that the first DCI carries a first indicator field, determining the target reference signal according to indication information of the first indicator field;

wherein the first indicator field is a sounding reference signal resource indicator field.

15. A network device, comprising a memory, a processor, and a program or instructions stored in the memory and capable of running on the processor, wherein the program, when being executed by the processor, causes the processor to implement the steps of the reference signal processing method according to claim 10.

16. A terminal, comprising a memory, a processor, and a program stored in the memory and capable of running on the processor, wherein the program, when being executed by the processor, causes the processor to implement a first operation in a case that a first object schedules or configures a resource of a second object for sidelink (SL) transmission/reception;

wherein the first object and the second object each is a cell, and the first operation comprises:

determining a target reference signal corresponding to power of a physical uplink shared channel (PUSCH) transmission scheduled by a target control signaling on the first object, wherein the target reference signal is used for path loss measurement for the second object, wherein the target control signaling is downlink control information (DCI) format 0_0, the first object is a cell that schedules an SL resource, and the second object is a cell where the SL resource is located, wherein the reference signal determining method further comprises: performing power control based on the path loss measurement for the second object.

* * * * *